(12) United States Patent
Fujita

(10) Patent No.: US 9,953,251 B2
(45) Date of Patent: Apr. 24, 2018

(54) IMAGE PROCESSING APPARATUS AND IMAGE PROCESSING METHOD FOR EXECUTING IMAGE PROCESSING USING MULTIPLE SERIAL IMAGE PROCESSING UNITS TO PROCESS DIFFERENT COLORS

(71) Applicant: CANON KABUSHIKI KAISHA, Tokyo (JP)

(72) Inventor: Shigeru Fujita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/145,166

(22) Filed: May 3, 2016

(65) Prior Publication Data
US 2016/0247052 A1    Aug. 25, 2016

Related U.S. Application Data

(63) Continuation of application No. 14/254,672, filed on Apr. 16, 2014, now Pat. No. 9,361,057.

(30) Foreign Application Priority Data

Apr. 19, 2013  (JP) .................................. 2013-088705

(51) Int. Cl.
*G06K 15/00* (2006.01)
*G06F 3/12* (2006.01)
(Continued)

(52) U.S. Cl.
CPC ........... *G06K 15/402* (2013.01); *G03G 15/50* (2013.01); *G06F 3/1293* (2013.01); *G06F 9/54* (2013.01); *G06K 15/02* (2013.01); *G06K 15/18* (2013.01); *G06K 15/1857* (2013.01); *G03G 2215/00021* (2013.01); *G06K 2215/0082* (2013.01)

(58) Field of Classification Search
None
See application file for complete search history.

(56) References Cited

U.S. PATENT DOCUMENTS 5,889,537 A * 3/1999 Shimada .............. G06K 15/105
                                                    347/41
6,081,344 A * 6/2000 Bockman ............... G06F 15/00
                                                    358/1.16
(Continued)

FOREIGN PATENT DOCUMENTS

JP    2001-283211 A    10/2001
JP    2005-094126 A    4/2005

*Primary Examiner* — Martin Mushambo
(74) *Attorney, Agent, or Firm* — Canon U.S.A., Inc. IP Division

(57) ABSTRACT

An apparatus includes multiple image processing units configured to execute image processing on input data, which are connected in serial, and include two or more image processing units having the same image processing function. The image processing units include a transfer unit configured to transfer input first data to a next image processing unit without changing the data, and an image processor configured to execute image processing on the first data to output second data. At least one of the image processing units transfers the first data to the next image processing unit without changing the first data when the first data is input, and also outputs the second data.

24 Claims, 10 Drawing Sheets

(51) Int. Cl.
    *G06F 9/54*         (2006.01)
    *G06K 15/02*     (2006.01)
    *G03G 15/00*     (2006.01)

(56) References Cited

U.S. PATENT DOCUMENTS

| | | | |
|---|---|---|---|
| 7,269,785 B1* | 9/2007 | Halfant | H04N 19/85 |
| | | | 715/203 |
| 2002/0082716 A1* | 6/2002 | Hashimoto | G06F 15/8015 |
| | | | 700/2 |
| 2005/0246460 A1* | 11/2005 | Stufflebeam, Jr. | G06F 13/4022 |
| | | | 710/104 |
| 2005/0248584 A1* | 11/2005 | Takeo | G06F 13/4027 |
| | | | 345/603 |
| 2006/0227143 A1* | 10/2006 | Maita | H04N 1/00236 |
| | | | 345/501 |
| 2012/0042110 A1* | 2/2012 | Nakazono | G06F 13/14 |
| | | | 710/305 |

* cited by examiner

IMAGE PROCESSING APPARATUS AND IMAGE PROCESSING METHOD FOR EXECUTING IMAGE PROCESSING USING MULTIPLE SERIAL IMAGE PROCESSING UNITS TO PROCESS DIFFERENT COLORS

CROSS-REFERENCE TO RELATED APPLICATIONS

This application is a Continuation of U.S. application Ser. No. 14/254,672, filed Apr. 16, 2014, which claims priority from Japanese Patent Application No. 2013-088705, filed Apr. 19, 2013. U.S. application Ser. No. 14/254,672 and Japanese Patent Application No. 2013-088705 are hereby incorporated by reference herein in their entireties.

BACKGROUND OF THE INVENTION

Field of the Invention

The present invention relates to an image processing apparatus and an image processing method, which execute image processing using multiple image processing units.

Description of the Related Art

Heretofore, in order to improve processing performance, an image processing apparatus has been made to operate multiple function units in parallel. There have been known an image processing apparatus including one ASIC on which multiple image processing modules are mounted, configured to operate multiple image processing modules in parallel within the chip, and an image processing apparatus in which multiple image processing chips are externally connected to an external bus, configured to operate multiple chips in parallel. However, in the case of connecting the multiple chips by the bus, performance is restricted, since the transfer performance of the bus is a bottleneck. Therefore, there has been proposed an image system in which Peripheral Component Interconnect (PCI) Express (registered trademark, hereinafter referred to as PCIe) which is a high-speed serial interface for point-to-point connection is employed (see Japanese Patent Laid-Open No. 2005-323159). The image system according to Japanese Patent Laid-Open No. 2005-323159 to which multiple image processing units are connected configured to selectively operate image processing units in parallel according to details of image processing.

The image system according to Japanese Patent Laid-Open No. 2005-323159 is configured so as to connect multiple image processing modules having the PCIe interface via a device chip called as a PCIe switch. In the case of this configuration, in order to improve processing performance, the multiple image processing modules having the same function are connected to the PCIe switch to perform parallel processing. In this case, since the number of ports of the PCIe switch has to be increased corresponding to the number of processing modules to be increased, the circuit scale and the number of terminals of the PCIe switch chip are increased in proportion to the number of the ports.

Also, Japanese Patent Laid-Open No. 2005-323159 discloses an example in which image data equivalent to one page is divided in the main scanning direction using the multiple image processing modules, and the image data is processed in parallel at each processing module in a distributed manner. However, in the case of diving image processing using such a method, upon the number of the processing modules being increased for handling high speed, since the number of divisions in the main scanning direction is also increased, a dividing method of input image data, and a coupling method for the image data after processing are complicated.

SUMMARY OF THE INVENTION

According to an embodiment of the present invention, an apparatus includes multiple image processing units configured to execute image processing on input data, which are connected in serial, and include two or more image processing units having the same image processing function. The image processing units include a transfer unit configured to transfer input first data to a next image processing unit without changing the data, and an image processor configured to execute image processing on the first data to output second data. At least one of the image processing units transfers the first data to the next image processing unit without changing the first data when the first data is input, and also outputs the second data.

Further features of the present invention will become apparent from the following description of exemplary embodiments with reference to the attached drawings.

DESCRIPTION OF THE EMBODIMENTS

Hereinafter, embodiments of the present invention will be described in detail.

First Embodiment

Figure 1:
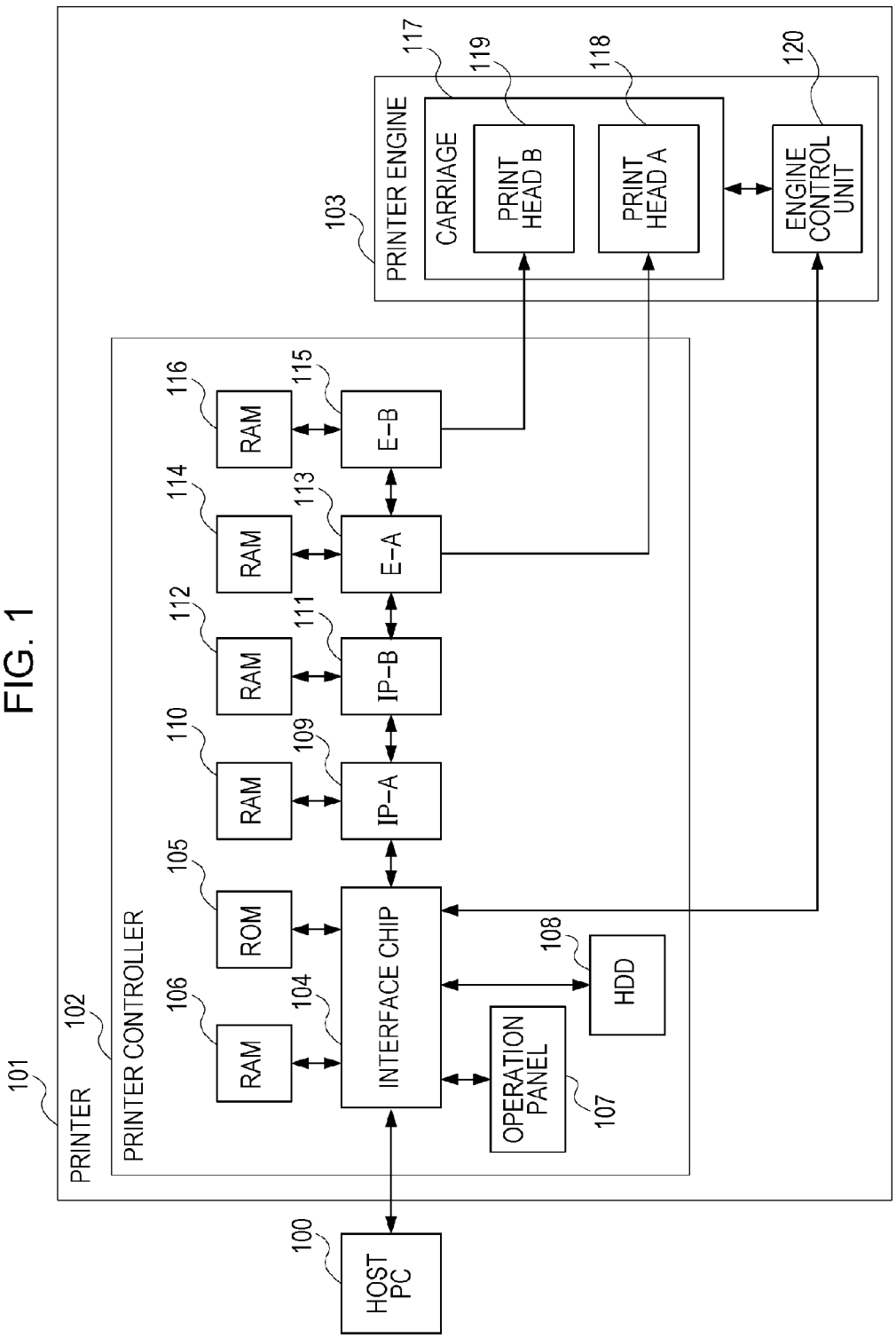
FIG. 1 is a block diagram illustrating a configuration of an image processing system according to a first embodiment.

FIG. 1 is a block diagram illustrating a configuration of a printer system serving as an example of an image processing system according to the present embodiment.

As illustrated in FIG. 1, a printer 101 which is an image processing apparatus is connected to a host PC 100 via an interface such as a LAN or USB or the like at a printer system.

The printer 101 includes a printer controller 102 and a printer engine 103. The printer controller 102 processes a print job received from the host PC 100, generates print data to be printed on a print medium, and transmits the print data thereof to the printer engine 103. The printer engine 103 performs suitable timing control to drive each motor and to form an image on the print medium (recorded medium) by ink (recording material) using the print data generated at the printer controller 102.

The printer controller 102 includes an interface chip 104 to be connected to the host PC 100, and multiple image processing units. Also, the printer controller 102 includes, as the image processing units, image processing chips 109 and 111 configured to process input image data to be input from the interface chip 104, and engine chips 113 and 115 configured to process data input from the image processing chips 109 and 111. In the case of the present embodiment, the image processing chips generate binary image data (quantized data) from multivalued image data transferred from the interface chip 104, and output this to the engine chips. Also, the engine chips generate print data to be output to a print header from the binary image data transferred from the image processing chips, and output the print data to the print head (print heads A118 and B119).

The interface chip 104 is connected to RAM 106, ROM 105, an operation panel 107, and an HDD 108, and also connected to an engine control unit 120 of the printer engine 103. Further, the interface chip 104 is connected to one of the image processing chips (IP-A109).

The ROM 105 holds the control procedure, processing procedure, and so forth, of the printer controller 102.

The operation panel 107 performs input processing by a user, and performs instructions and setting on the host PC 100. Though the operation panel 107 is employed in the present embodiment, the operation panel 107 may be an input device such as a keyboard or pointing device or the like.

The printer controller 102 according to the present embodiment includes two of an IP-A 109, an IP-B 111 which are the same type chip as image processing chips. Specifically, the IP-A 109 and IP-B 111 are serially connected, and the IP-A 109 is connected to the interface chip 104. That is to say, the image processing chip IP-A 109 is connected to the interface chip 104, and the image processing chip IP-B 111 is connected to the image processing chip IP-A 109 in order. In this manner, the printer controller 102 includes a processing unit group where the image processing chips are serially connected. As illustrated in FIG. 1, the RAM 110 is connected to the IP-A 109 chip, and the RAM 112 is connected to the IP-B 111 chip.

Also, the printer controller 102 according to the present embodiment includes two of an E-A 113 and an E-B 115 which are the same type chip as engine chips. Specifically, the E-A 113 and E-B 115 are serially connected, and the E-A 113 is connected to the IP-B 111. That is to say, the E-A 113 chip is connected to the IP-B 111, and the E-B 115 chip is connected to the E-A 113 chip in order. In this manner, the printer controller 102 includes a processing unit group where the engine chips are serially connected. As illustrated in FIG. 1, the RAM 114 and printer head A 118 are connected to the E-A 113 chip, and the RAM 116 and printer head B 119 are connected to the E-B 115 chip. Thus, the engine chips are each connected to a different printer head.

As described above, the printer controller 102 has a configuration in which an interface between two chips is mutually connected to each of the multiple image processing chips and multiple engine chips, whereby the chips are connected in serial (hereinafter, also referred to as cascade). The print data transmitted from the host PC 100 is received at the interface chip 104, and is sequentially transferred to the image processing chips (IP-A 109 and IP-B 111), and subjected to image processing, and next transferred to the engine chips (E-A 113 and E-B 115). Next, the data is subjected to image processing at the engine chips to be transformed into print data, and transmitted to the print heads.

The printer engine 103 includes a carriage 117 on which the print heads are mounted, an engine control unit 120, a driving motor, a print media conveying mechanism, and an ink supply system which are not illustrated.

The two print heads (print head A 118 and print head B 119) are mounted on the carriage 117. The print head A 118 and print head B 119 are connected to the engine chips E-A 113 and E-B 115, respectively. The print heads receive print data output from the engine chip, and eject ink from a head nozzle portion which is not illustrated. The ejected ink is applied to the print medium to form an image thereon.

The engine control unit 120 drives the carriage 117, and a driving motor and a print media transporting mechanism which are not illustrated, at suitable timing using a control signal.

Figure 2:
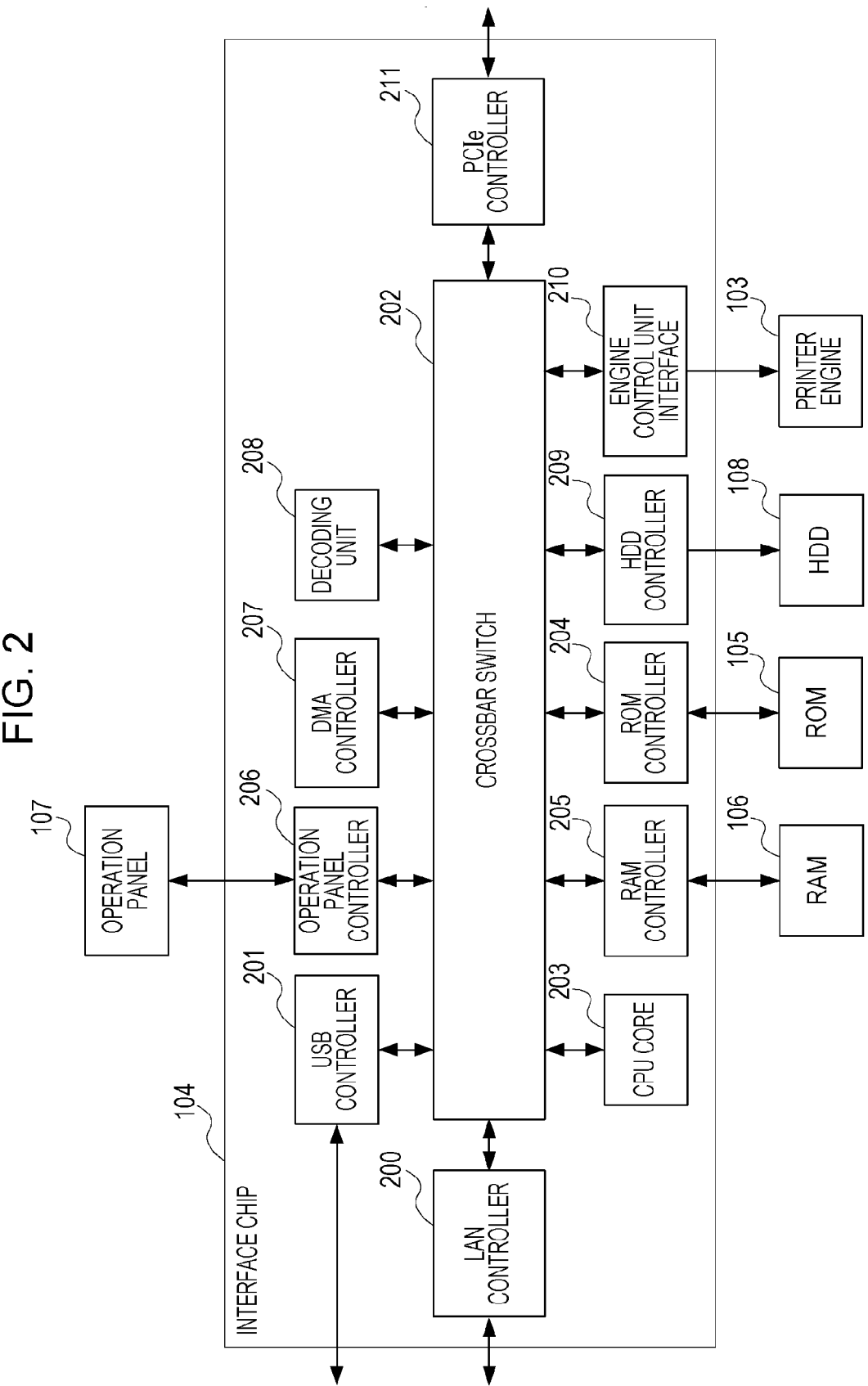
FIG. 2 is a block diagram illustrating a configuration of an interface chip according to the first embodiment.

FIG. 2 is a block diagram illustrating an internal configuration of the interface chip 104 according to the present embodiment.

As illustrated in FIG. 2, various function blocks are connected to a crossbar switch 202, and are mutually communicable. The printer 101 includes a LAN and USB as interfaces for communicating with the host PC, which are controlled by a LAN controller 200 of the interface chip 104, and a USB controller 201 of the interface chip 104, respectively.

The interface chip 104 performs control within the chip using a CPU core 203, the ROM 105 connected to a ROM controller 204, the RAM 106 connected to a RAM controller 205, and an HDD 108 connected to an HDD controller 209.

The operation panel 107 is connected to the crossbar switch 202 via an operation panel controller 206.

Also, the interface chip 104 performs data communication using a DMA controller 207 and a decoding unit 208.

An engine control unit interface 210 is connected to the printer engine 103, and outputs a timing control signal for driving the carriage 117, or driving motor or print media transporting mechanism which are not illustrated.

A PCIe controller 211 performs communication control of PCIe which is a connection interface between an image processing chip and another chip. The PCIe controller 211 performs route complex operation. The PCIe controller 211 is an interface conforming to the PCI Express standard (PCIe, registered trademark). Note that, though the PCIe which is a high-speed serial interface for point-to-point connection for connection between an image processing chip and another chip is employed in the present embodiment, the interface is not restricted to this, and another interface may be employed.

The CPU core 203 operates in accordance with a program stored in the ROM 105 or HDD 108 at the interface chip 104.

Also, communication data (image data) input from the host PC is stored in the RAM 106 via the LAN controller 200 or USB controller 201, subjected to communication protocol processing by the CPU core 203, and is stored in the HDD 108. In the case of having received compressed image data, the imaged data is subjected to a decoding process using the decoding unit 208, and is stored in the RAM 106. The input image data after decoding is read out by the DMA controller 207, and is transferred to an image processing chip through the PCIe controller 211.

Also, power supply control of the printer and instructions of operation setting of the printer are performed via the operation panel 107 by the user. A button operation or key operation at the operation panel 107 is received by the operation panel controller 206, following which the operation is transmitted to the CPU core 203 by an interrupt, and the corresponding processing is performed.

Figure 3:
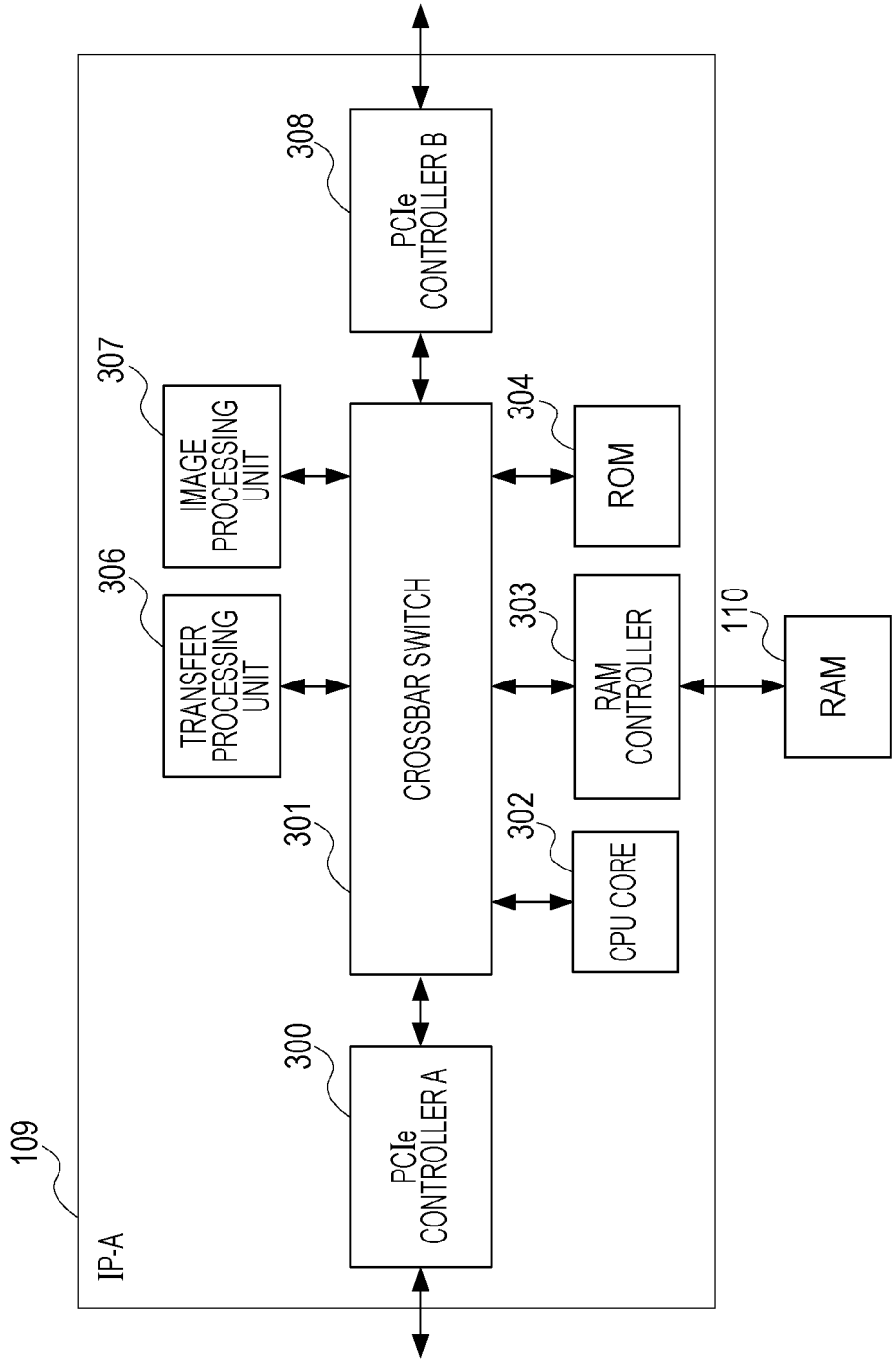
FIG. 3 is a block diagram illustrating a configuration of an image processing chip according to the first embodiment.

FIG. 3 is a block diagram illustrating an internal configuration of the IP-A 109 which is an image processing chip according to the present embodiment. The two of the same image processing chips are mounted on the printer controller 102, are the IP-A 109 and IP-B 111, respectively. Note that, though the IP-A 109 will be described here, the IP-B 111 also has the same internal configuration.

The IP-A 109 has a configuration in which various function blocks are connected to a crossbar switch 301, and are mutually communicable. A PCIe controller A 300 performs interface control as to the upstream chip. Also, the PCIe controller A 300 operates in an end-point mode, and is connected to the PCIe controller 211 which operates in the route complex mode of the interface chip 104.

The image processing chip IP-A 109 performs control within the chip using a CPU core 302, ROM 304, and RAM 110 connected to a RAM controller 303. The CPU core 302 of the IP-A 109 operates in accordance with the program stored in the ROM 304. The ROM 304 is housed in the IP-A 109, and is controlled by a ROM controller which is not illustrated. Also, the RAM 110 is controlled by the RAM controller 303.

A PCIe controller B 308 performs interface control as to the IP-B 111 which is the downstream chip. The PCIe controller B 308 operates in the route complex mode.

A transfer processing unit 306 reads out data stored in the RAM 110 in accordance with instructions from the CPU core 302, and transfers the data to a predetermined address of the downstream chip via the PCIe controller B 308.

An image processing unit 307 reads out image data stored in the RAM 110 in accordance with instructions from the CPU core 302, subjects the data to image processing, and transfers the data after the image processing to the predetermined address of the downstream chip as the processing result. The input image data transmitted from the interface chip 104 is stored in the RAM 110 via the PCIe controller A 300. The CPU core 302 receives a data transfer completion notification from the upstream chip to perform execution control of predetermined data processing in accordance with the connection chip configuration. The data processing mentioned here includes transfer processing for transferring data after image processing, and transfer processing for transferring data to the downstream chip without performing image processing.

The image processing unit 307 includes a circuit configured to perform various types of image processing, such as input gamma correction, color space conversion, output gamma correction, binarization processing, and so forth. This image processing unit 307 includes multiple systems of these circuits, in other words, these function circuit blocks, and is capable of multi-color processing in parallel at the same time. The input image data has 10-bit grayscale of each color of RGB in the present embodiment. The image processing unit 307 decomposes the input image data into ink colors using color space conversion processing, and performs binarization processing. For example, providing four systems of function circuit blocks enables the input image data to be rasterized into the four colors of CMYK at the maximum, and enables processing to be performed. Next, performing predetermined setting on a register included in each circuit enables the number of simultaneously settable ink colors to be set in a range of one to four colors.

Note that the image processing chip IP-B 111 is configured having, as described above, the same configuration as that of the IP-A 109, and operates in the same way as the IP-A 109. The upstream of the image processing chip IP-B 111 is not connected to the interface chip 104 but to the image processing chip IP-A 109, and the downstream thereof is connected to the engine chip E-A 113.

Figure 4:
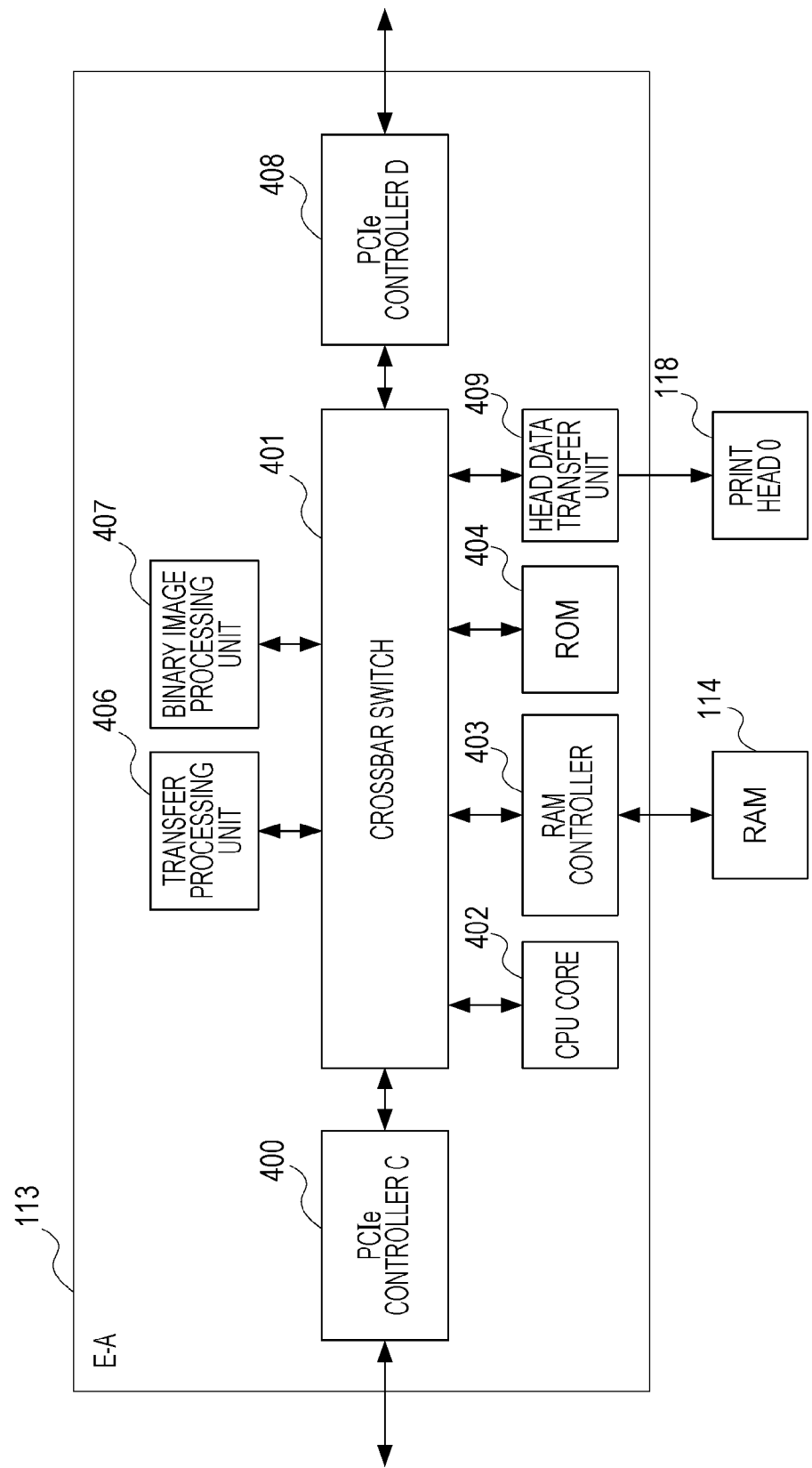
FIG. 4 is a block diagram illustrating a configuration of an engine chip according to the first embodiment.

FIG. 4 is a block diagram illustrating an internal configuration of the engine chip E-A 113 according to the present embodiment. The two same engine chips mounted on the printer controller 102 in the present embodiment are the engine chips E-A 113 and E-B 115. Though the E-A 113 will be described here, the E-B 115 also has the same internal configuration.

The E-A 113 has a configuration in which various function blocks are connected to a crossbar switch 401, and are mutually communicable. The E-A 113 performs control within the chip using a CPU core 402, ROM 404, and RAM 114 connected to a RAM controller 403. Specifically, the CPU core 402 of the engine chip E-A 113 operates in accordance with the program stored in the ROM 404. The ROM 404 is housed in the E-A 113, and is controlled by a ROM controller which is not illustrated. Also, the RAM 114 is controlled by the RAM controller 403.

A PCIe controller C 400 operates in the end-point mode, and is connected to the PCIe controller B 308 which operates in the route complex mode of the upstream chip (image processing chip IP-B 111).

A PCIe controller D 408 performs interface control as to the downstream chip (engine chip E-B 115). The PCIe controller D 408 operates in the route complex mode.

A head data transfer unit 409 transfers head data to the print head A 118.

A transfer processing unit 406 reads out data stored in the RAM 114 in accordance with instructions from the CPU core 402, and transfers the data to a predetermined address of the downstream chip via the PCIe controller D 408. A binary image processing unit 407 reads out image data from the RAM 114 in accordance with instructions from the CPU core 402 to perform binary image processing, and writes the data after the image processing back to the RAM 114 as the processing result. The binary image data transmitted from the image processing chip IP-B 111 is stored in the RAM 114 via the PCIe controller C 400.

The CPU core 402 receives the data transfer completion notification from the upstream chip (IP-B 111 in the present embodiment), and performs execution control of predetermined data processing in accordance with the connection chip configuration. The data processing mentioned here includes processing for transferring data to the downstream chip after performing image processing, processing for transferring data to the downstream chip without performing image processing, and processing for transferring data after image processing to the print head A 118.

The binary image processing unit 407 includes a circuit configured to perform various type of image processing, such as smoothing processing or the like, on binary image data. Also, the binary image processing unit 407 includes multiple systems of these circuit blocks, and is capable of image processing in parallel at the same time. For example, providing four systems of function circuit blocks enables each color of four colors of CMYK to be processed in parallel. Further, performing predetermined setting on a register included in each image processing circuit enables the number of simultaneously settable colors to be set in a range of one to four colors.

Note that the engine chip E-B 115 is configured having the same configuration as that of the E-A 113 as described above, and operates in the same way. The upstream of the engine chip E-B 115 is not connected to the image processing chip IP-B 111 but to the E-A 113.

Figure 5:
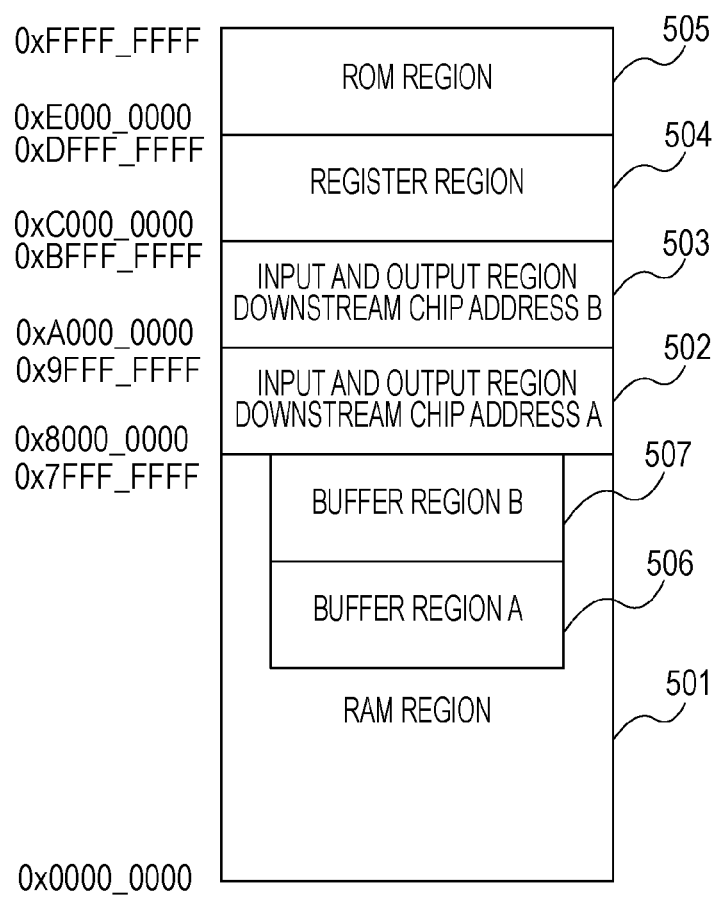
FIG. 5 is a diagram illustrating an address map of each chip according to the first embodiment.

FIG. 5 illustrates an example of an address map within the chip of each chip of the image processing chips (IP-A 109 and IP-B 111) and engine chips (E-A 113 and E-B 115). In FIG. 5, the addresses are represented by being delimited into four digits in hexadecimal number (0x).

A region from 0x0000_0000 to 0x7FFF_FFFF is allocated to a RAM region 501, where the RAM connected to each chip is accessible. For example, in the case of the IP-A 109, the RAM 110 is accessible, and in the case of the E-B 115, the RAM 116 is accessible.

Also, an input and output region from 0x8000_0000 to 0xBFFF_FFFF is a connection region what we call. A region of 0x8000_0000 to 0x9FFF_FFFF is allocated to a downstream chip address A 502, and a region of 0xA000_0000 to 0xBFFF_FFFF is allocated to a downstream chip address B 503. Accessing these addresses enables the chip connected to the downstream to be accessible.

The downstream chip address A 502 is used as a region for transferring data that the downstream chip uses. On the other hand, the downstream chip address B 503 is used as a region for transferring data that the downstream chip does not use. The data transferred from the "downstream chip address A 502" on the upstream is transferred to a later-described buffer region A 506. The data transferred from the "downstream chip address B 503" on the upstream is transferred to a later-described buffer region B 507.

The downstream chip address B 503 is used as a region for transferring data that the IP-B 111 does not use to the IP-B 111 in the case of transferring data after the binarization processing from the image processing chip IP-A 109 to the engine chip E-A 113, for example. The data that the IP-B 111 does not use in this case is the data after the binarization processing of the IP-A 109. The IP-B 111 connected between the IP-A 109 and the E-A 113 does not use the data after the binarization processing of the IP-A 109 transferred from the downstream chip address B 503 of the IP-A 109 by itself, and accordingly transfers the data after the binarization processing of the IP-A 109 to the E-A 113 without reprocessing.

A region from 0xC000_0000 to 0xDFFF_FFFF is a register region 504 where a register group for control and setting of the internal circuit of each chip is disposed. Setting for causing the internal circuits to perform desired operation is performed on this region.

A region from 0xE000_0000 to 0xFFFF_FFFF is a ROM region 505. The ROM mentioned here is ROM mounted on the inside of each chip. The chips operate in accordance with the stored program and setting data.

Also, two buffer regions (buffer region A 506 and buffer region B 507) are provided within the RAM region 501. The buffer region A 506 is used as a region for storing data that a chip uses. Specifically, data transferred from the downstream chip address A 502 of the upstream chip is stored in the buffer region A 506. Note that whether or not the data stored in the buffer region A 506 is used for image processing by the chip itself is set beforehand, and the image processing unit of each chip operates in accordance with the settings. The buffer region B 507 is not used by the chip itself, and is used as a region for storing data to be used only by the next chip. Specifically, the data transferred from the downstream chip address B 503 of the upstream chip is stored in the buffer region B 507.

The address map of each chip of the address maps between chips is allocated such that the downstream chip address A 502 of the upstream chip is allocated so as to be accessible to the buffer region A 506 in the address map of the downstream chip. Also, the downstream chip address B 503 of the upstream chip is allocated so as to be accessible to the buffer region B 507 in the address map of the downstream chip. The PCIe controller of each chip includes a mechanism capable of such address allocation.

Figure 6:
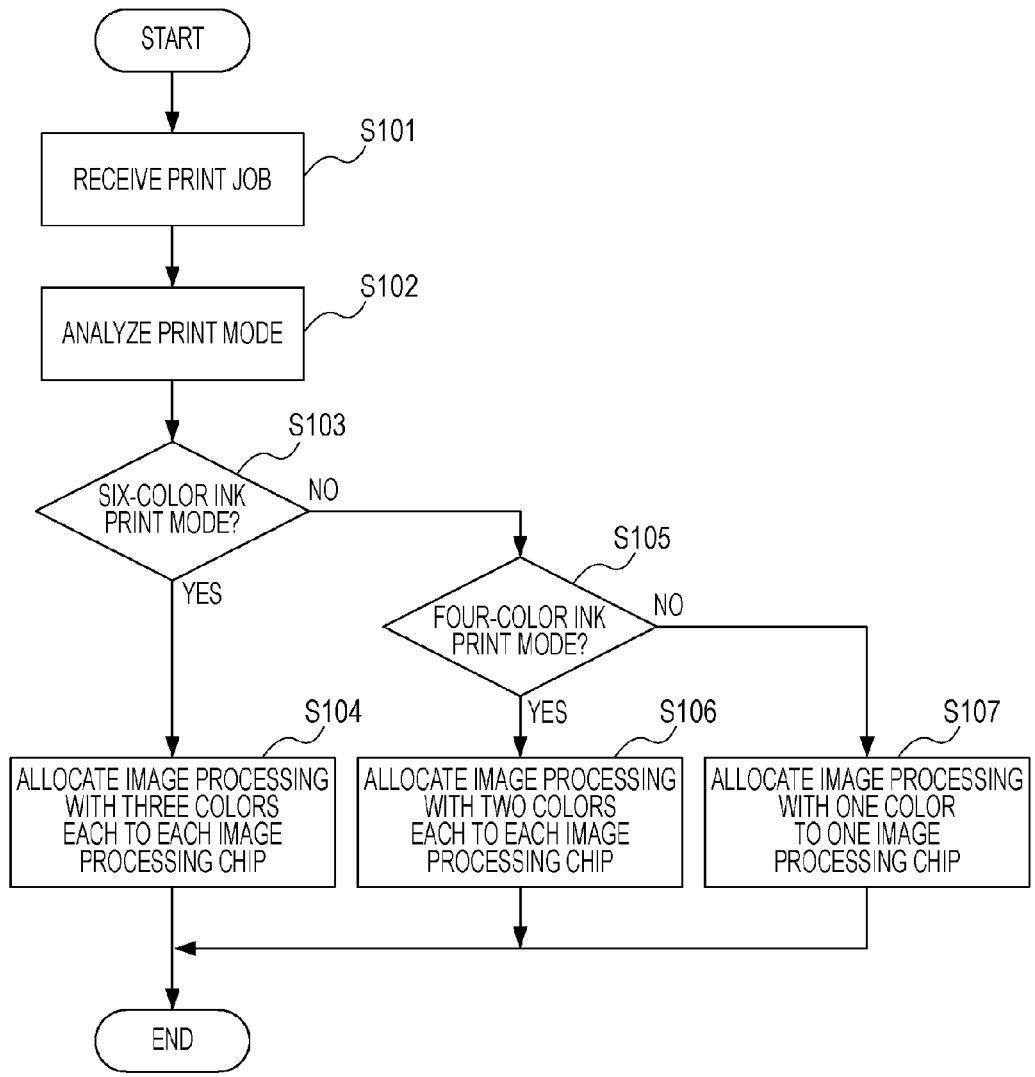
FIG. 6 is a flowchart illustrating a method for allocating a data processing color to each image processing chip according to the first embodiment.

FIG. 6 is a flowchart illustrating an example of a method for allocating a color for data processing at each image processing chip. This processing is executed by the interface chip 104.

In S101, the interface chip 104 receives a print job transmitted from the host PC 100. Specifically, the interface chip 104 receives a print job from the LAN controller 200 or USB controller 201 which is the host interface of the interface chip 104.

Next, in S102, the interface chip 104 performs analysis of a print mode. Specifically, the interface chip 104 analyzes the contents of the received print job, decides a print mode such as the number of print ink colors, print resolution, print speed, and so forth, and decides allocation of a color for data processing at each image processing chip.

In S103, the interface chip 104 determines whether or not this mode is a mode with ink of six colors. In the case of using six colors, the interface chip 104 proceeds to S104, or otherwise proceeds to S105.

In S104, the interface chip 104 allocates image processing with three colors at a time to the image processing chips. As described with reference to FIG. 1, the image processing chips IP-A 109 and IP-B 111 are capable of image processing with the maximum of four colors at the same time. Image processing with three colors is allocated to the image processing chips IP-A 109 and IP-B 111 in the present embodiment. That is to say, image processing with six colors in total is performed at the image processing chips IP-A 109 and IP-B 111.

In S105, the interface chip 104 determines whether or not the mode is a mode with ink of four colors. In the case of using four colors, the interface chip 104 proceeds to S106, or otherwise proceeds to S107.

In S106, the interface chip 104 allocates image processing with two colors at a time to the image processing chips. Image processing with two colors is allocated to each of the image processing chips IP-A 109 and IP-B 111 in the present embodiment. That is to say, image processing with four colors in total is performed at the image processing chips IP-A 109 and IP-B 111.

In S107, the interface chip 104 allocates image processing with one color to one image processing chip. In the case of neither the print mode with ink of six colors nor the mode with ink of four colors in the present embodiment, one color is allocated to the image processing chip IP-A 109 in FIG. 1, but a color for image processing is not allocated to the image processing chip IP-B 111. Examples of a case with one color alone include a monochrome mode in which only black ink is used. In this case, the image processing chip IP-B 111 does not perform image processing, and performs transfer processing alone for transferring data to be used by the downstream engine chip.

As described above, the amount of image processing per one image processing chip is reduced by reducing the number of colors to be allocated to one image processing chip, whereby increase in speed and increase in resolution of the printer can be realized. Specifically, bus use efficiency can be improved by connecting multiple image processing chips and reducing the amount of image processing per one image processing chip. Thus, processing speed as a whole can be increased.

Also, colors have been allocated to the image processing chips so as to equalize the number of processing colors to be allocated in the present embodiment. For example, in the case of the six-color ink mode (e.g., high quality mode), three colors have been allocated to the image processing chips, and in the case of a normal quality mode, four colors have been used, and two colors have been allocated as described in S106. Also, in the case of a monochrome high-resolution print mode, one black color has been allocated to one image processing chip. Thus, the processing amount of each image processing chip is generally equal, whereby printing can be performed at high speed with high resolution without image processing by one of the image processing chips causing a bottleneck.

Note that, though description has been made here regarding the image processing chips, the engine chips performs processing by enabling only ink colors to be used.

Figure 7:
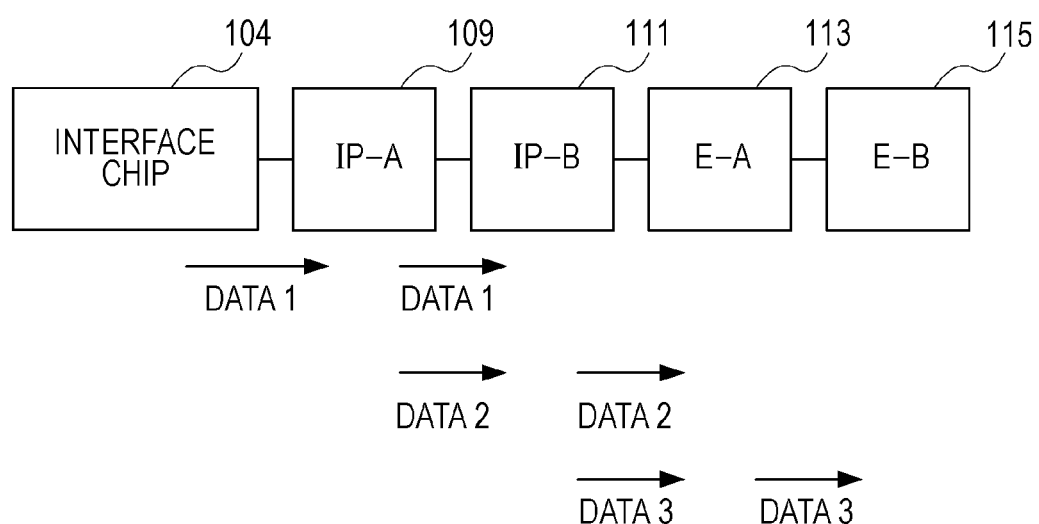
FIG. 7 is an explanatory diagram illustrating data types to be handled at each chip in the first embodiment.

FIG. 7 is a schematic diagram illustrating the type of data to be handled by each chip and whether to transmit data from which chip to which chip in the chip configuration in FIG. 1. Each chip of the image processing chips IP-A 109 and IP-B 111, and the engine chips E-A 113 and E-B 115 includes a circuit block capable of processing image data with four colors in parallel. Though each chip is capable of processing with the maximum of four colors, description will be made in FIG. 6 regarding a case where processing with two colors has been allocated to each chip.

First, the interface chip 104 received print data from the host PC 100 which is not illustrated, and generates data decoded from the compressed data after various types protocol processing for communication. This data is multivalued grayscale data of color space of RGB. FIG. 7 illustrates the RGB data as data 1.

The data 1 is used at the image processing chips IP-A 109 and IP-B 111. As illustrated in FIG. 7, the data 1 is first transferred from the interface chip 104 to the image processing chip IP-A 109, and also transferred from the interface chip 104 to the image processing chip IP-B 111 via the image processing chip IP-A 109.

Since the data 1 is data to be used at the image processing chip IP-A 109, the data 1 is transferred to a downstream chip address A region 502 of the interface chip 104, and is stored in a buffer region A 506 of the image processing chip IP-A 109. The image processing chip IP-A 109 performs image processing on the data 1 (RGB data) to generate data 2 which is binary image data of two colors (cyan C and magenta M) of ink color data of ink color space.

Though the data 2 is transferred to the image processing chip IP-B 111, the data 2 is not used at the IP-B 111, and is transferred to the engine chip E-A 113. Accordingly, the data 2 is transferred to a downstream chip address region B 503 of the image processing chip IP-A 109, and is stored in a buffer region B 507 of the image processing chip IP-B 111.

Further, as described above, the data 1 is transferred to the image processing chip IP-B 111 from the interface chip 104 via the image processing chip IP-A 109. That is to say, the image processing chip IP-A 109 performs processing for generating the data 2, and also performs processing for transferred the data 1 to the image processing chip IP-B 111 without change. Since the data 1 is data to be used at the image processing chip IP-B 111, the data 1 is transferred to the downstream chip address region A 502 of the image processing chip IP-A 109, and is stored in the buffer region A 506 of the image processing chip IP-B 111.

The image processing chip IP-B 111 performs image processing on the received data 1 to generate data 3 which is binary image data of two colors (yellow Y and black BK) of component data of ink color space. Though the data 3 is transferred to the engine chip E-A 113, the data 3 is not used at the E-A 113, and is transferred to the engine chip E-B 115. Thus, since the data 3 is not used at the engine chip E-A 113, the data 3 is transferred to a downstream chip address region B 503 of the image processing chip IP-B 111, and is stored in a buffer region B 507 of the engine chip E-A 113. On the other hand, since the data 2 received from the image processing chip IP-A 109 is data to be used at the engine chip E-A 113, the data 2 is transferred to a downstream chip address region A 502 of the image processing chip IP-B 111, and is stored in a buffer region A 506 of the engine chip E-A 113.

The engine chip E-A 113 performs image processing on the data 2 to generate data for the head, and transfers this to the print head A 118 which is not illustrated. Further, the engine chip E-A 113 also performs processing for transferring the data 3 to the engine chip E-B 115. The data 3 is transferred to a downstream chip address region A 502 of the engine chip E-A 113, and is transferred to the buffer region 506 of the engine chip E-B 115.

The engine chip E-B 115 performs image processing on the data 3 to generate data for the head, and transfers this data to the print head B 119 which is not illustrated.

As described above, the input image data output from the interface chip 104 is subjected to generation processing in a distributed and parallel manner at the image processing chip IP-A 109, image processing chip IP-B 111, engine chip E-A 113, and engine chip E-B 115. More specifically, the input image data is transferred to the image processing chips (IP-A 109 and IP-B 111), and performs processing of each image processing chip for each ink color in parallel in a distributed manner. The binary image data (quantized data) obtained from each image processing chip is transferred to the corresponding engine chips (E-A 113 and E-B 115), and parallel processing of the binary image data is performed at the engine chips. Finally, an image can be formed by supplying the generated head data to the printer heads. Thus, the input image data output from the interface chip 104 is transferred to a particular chip via another chip in the present embodiment.

The image processing chips have been configured to have the function for processing data received from the upstream chip at the own image processing circuit, and the function for transferring the data received from the upstream chip to the downstream chip in the present embodiment. Similarly, the engine chips have been configured to have the function for processing data received from the upstream chip at the own circuit, and the function for transferring the data received from the upstream chip to the downstream chip. The multiple image processing chips and engine chips have been configured to be connected in a cascade manner using a high-speed inter-chip interface, whereby ink color data can be processed at each chip in a distributed and parallel manner.

Thus, parallel processing with improved use efficiency of the bus can be realized, and an image formation system can be configured at a low price. In the case of connecting the chips to an interface chip in parallel, upon the number of chips being increased for improving throughput, the number of terminals, circuit scale, and the number of ports of the PCIe switch chip are increased. On the other hand, unlike the prior art, a switch chip for connecting multiple image processing chips equivalent to the image processing modules does not have to be provided in the present embodiment. Also, even if the number of image processing chips is increased, cost increase due to increase in the number of pins of the switch chip can be avoided by connecting a two-port PCIe interface using an adjacent chip. Also, unlike the prior art, control accompanied with complicated situation determination does not have to be performed along with increase in the number of processing modules, and a simple and scalable circuit as to the number of processing modules can be realized.

That is to say, the image processing system according to the present embodiment is capable of changing the processing performance and the number of chips in a scalable manner without increasing the circuit scale and the number of terminals of the system in proportion to the number of chips at the time of increasing the number of the image processing chips for improving the processing performance. In other words, the throughput of each chip does not have to match the highest throughput requested for image processing, and desired processing can be executed by selecting the processing performance of a chip and the number of chips as appropriate. Accordingly, an image processing system with high scalability and an image processing method with high scalability can be realized at a low price.

Also, as described above, an image processing chip uses part of the received data (input data) by itself, and transfers data not used to the next image processing circuit without change in the present embodiment. According to such a configuration, multiple image processing chips having the same configuration are connected, and different image data or different image processing is executed at each, whereby desired image processing can be performed. Also, details of processing to be executed at the image processing chips can be changed according to usage.

Other Embodiments

Though the present invention has been described so far with reference to the embodiment, the basic configuration of the present invention is not restricted to the above configuration. For example, the specific number of ink colors within the steps illustrated in FIG. 6 has been described in the first embodiment, but the number of ink colors is not restricted to this, and the number of ink colors may be changed according to the number of ink colors to be mounted and the number of use colors in the implemented print mode at an actual printer as appropriate.

Figure 8:
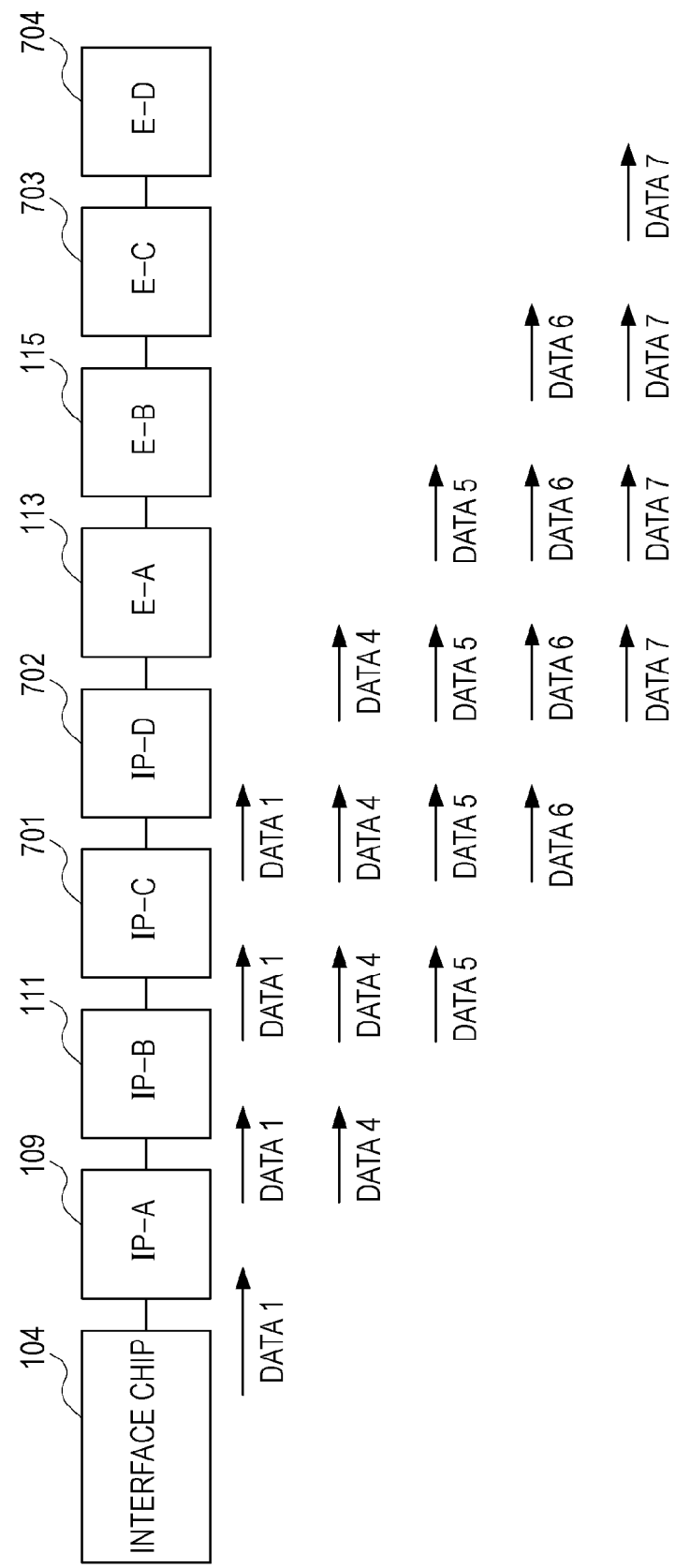
FIG. 8 is an explanatory diagram illustrating data types to be handled at each chip at the time of a configuration with four image processing chips and four engine chips in another embodiment.

Also, though the image formation system in which the two image processing chips and two engine chips are used has been described in the first embodiment, the numbers of the chips are not restricted to these. FIG. 8 is an example in which the image formation system is configured including four image processing chips and four engine chips, that is, the number of image processing chips and the number of engine chips are double in comparison with the chip configuration illustrated in FIG. 6. Now, description will be made regarding an example in which a printer capable of handling 12 colors is configured by allocating three colors to each chip, with reference to FIG. 8. In FIG. 8, the image processing chip IP-A 109, image processing chip IP-B 111, image processing chip IP-C 701, and image processing chip IP-D 702 each include a circuit block capable of processing image data of four colors in parallel in the same way as those of the image processing chips described in FIG. 7. Also, the engine chip E-A 113, engine chip E-B 115, engine chip E-C 703, and engine chip E-D 704 each include a circuit block capable of processing image data of four colors in parallel in the same way as those of the engine chips described in FIG. 7.

The data 1 is, in the same way as that in the first embodiment, RGB data. The data 1 is transferred to the image processing chips IP-A 109, IP-B 111, IP-C 701, and IP-D 702 which use this data for image processing.

First, the data 1 is processed at the IP-A 109, whereby data 4 which is binary image data with three colors (e.g., C, M, and Y) is generated. The generated data 4 is transferred between the chips until the data 4 arrives at the engine chip E-A 113 which uses the data 4. Specifically, the data 4 arrives at the engine chip E-A 113 via the IP-B 111, IP-C 701, and IP-D 702.

Also, the data 1 is processed at the IP-B 111, whereby data 5 which is binary image data with three colors (e.g., light cyan LC, light magenta LM, and black BK) is generated. The generated data 5 is transferred between the chips until the data 5 arrives at the engine chip E-B 115 which uses the data 5. Specifically, the data 5 arrives at the engine chip E-B 115 via the IP-C 701, IP-D 702, and E-A 113.

The data 1 is processed at the IP-C 701, whereby data 6 which is binary image data with three colors (three ink colors other than described above) is generated, and also processed at the IP-D 702, whereby data 7 which is binary image data with three colors (further remaining three ink colors). The data 6 and data 7 are transferred to the E-C 703 and E-D 704 which are chips using the corresponding ink color data in the same way, respectively.

As described above with reference to the first embodiment and FIG. 8, changing the number of chips making up the image processing system using the same chip capable of processing the maximum of four colors at the same time enables both a 4-color printer and a 12-color printer to be handled. That is to say, changing the number of chips as appropriate enables an ink color to be used at an image processing apparatus (printer in the present embodiment) of the image processing system to be handled. Also, as described above, since the processing is performed by allocating a different color to each chip, a program with the same algorism can be used at the image processing and data transfer processing to be performed at each chip. In other words, chips having the same configuration can be used by changing only the number of colors. Accordingly, increase in processing speed can be realized without performing complicated processing. Also, though the PCIe has been used at the time of connecting chips in the above embodiment, the interface is not restricted to this, and another interface may be used as long as this is an interface for connecting chips.

The mechanism has been described in the first embodiment in which at the time of performing data transfer between chips, data is transferred to an address within a chip set beforehand, whereby the data can be received by being divided into a buffer configured to transfer the data to the downstream chip without change and a buffer configured to use the data at the own image processing. However, the data transfer system between chips is not restricted to this, and another system may be used as long as this can perform data transfer between chips. Though the data received from the upstream chip has been stored temporarily on the RAM in the first embodiment, the processing for the received data is not restricted to this. For example, the data received from the upstream chip may be through the inside of the chip by directly routing to the input and output region address of the downstream chip using the crossbar switch within the chip without being stored on the RAM. Specifically, in FIG. 3, the data received through the PCIe controller A 300 may be a data path to be output to the PCIe controller B 308 via the crossbar switch 301. Employing such a system also enables the same advantage as that in the first embodiment to be obtained. Also, there may be another system in which data is transferred in increments of packets, and information indicating which chip the data is used at is added to the packets. That is to say, employing a system in which information within the packets is analyzed at the received chip to determine whether the packets are used by the received chip itself or transferred to the downstream chip also enables the same advantage as that in the first embodiment to be obtained.

Figure 9:
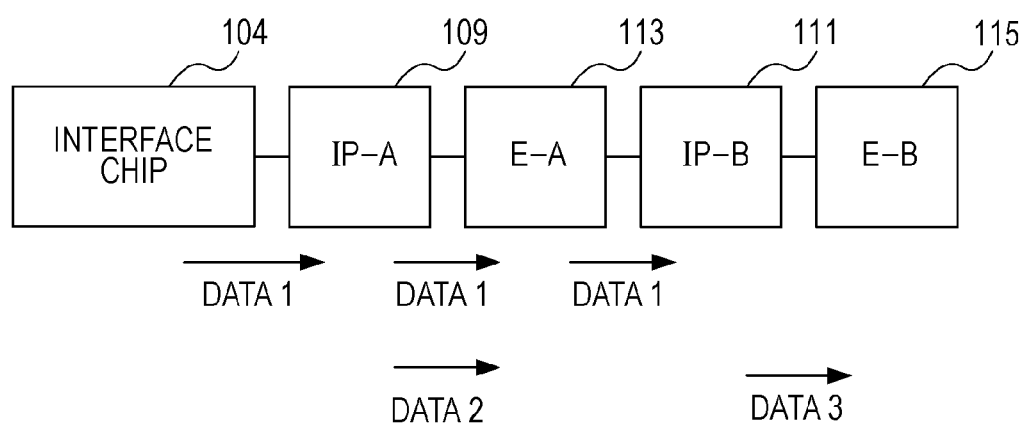
FIG. 9 is an explanatory diagram illustrating data types to be handled at each chip in another embodiment.
Figure 10:
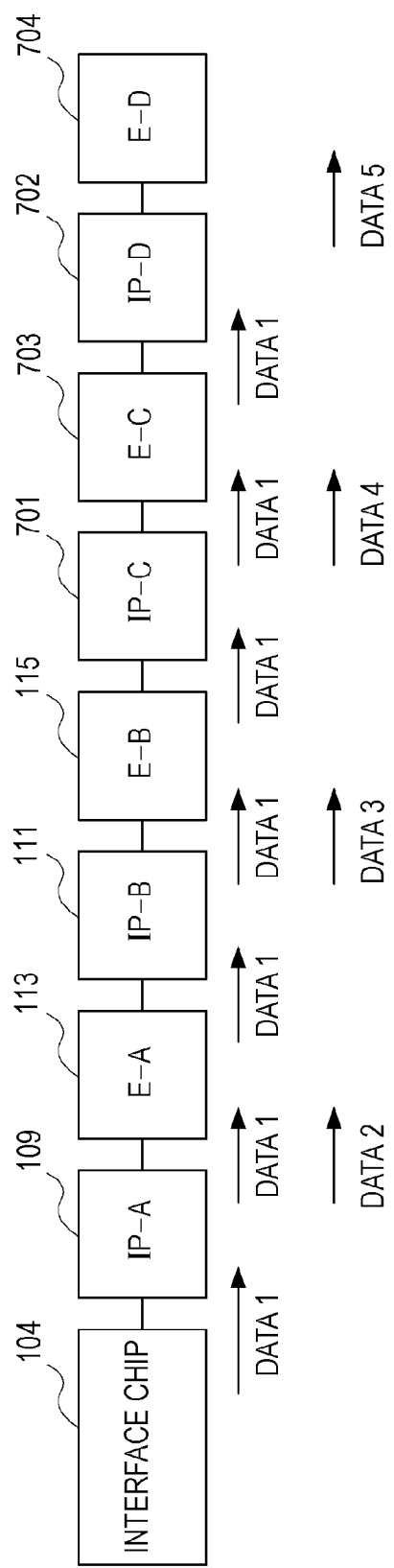
FIG. 10 is an explanatory diagram illustrating data types to be handled at each chip in another embodiment.

Also, the order for connecting the image processing chips and engine chips is not restricted to the first embodiment and the example described in FIG. 8. Specifically, the order is not restricted to that after connecting all of the image processing chips, the engine chips are all connected. For example, as illustrated in FIG. 9, in the case of employing two image processing chips and two engine chips, the image processing chips and engine chips may alternately be connected. In the case of employing four image processing chips and four engine chips as well, similarly, as illustrated in FIG. 10, the image processing chips and engine chips may alternately be connected. In the case of this connection configuration, the data 1 generated at the interface chip 104 is transferred to each of the image processing chips. At this time, as illustrated in FIGS. 9 and 10, the data is transferred between the chips. Also, since the data generated at the image processing chips (data 2, data 3, data 4, and data 5) is transmitted to the corresponding engine chip, the data is transferred between the chips. Setting the number of colors to be allocated to each chip to two in the same way as that in the first embodiment in the configuration in FIG. 9 enables a 4-color printer to be handled. Also, setting the number of colors to be allocated to each chip to three in the configuration in FIG. 10 enables a 12-color printer to be handled.

Though an example has been described in the above embodiment in which image processing of a predetermined ink color is allocated for each image processing chip, the image processing is not restricted to this. For example, processing for allocating image processing of different band data of the same ink color to different image processing chips may be combined, or processing for allocating image processing for each object kind, or for each attribute such as an image or text or the like may be combined.

Also, though the number of the image processing chips has been made to be the same as the number of the engine chips, the numbers are not restricted to these, and different numbers may be employed. However, setting the number of the image processing chips and the number of the engine chips to the same number enables the processing to be simplified, and also, a chip having great amount of processing can be suppressed from causing a bottleneck.

Further, though an example has been described in the first embodiment in which an image processing chip configured to perform binary processing on input image data and an engine chip configured to process the binary image data are implemented on a different chip, the configuration is not restricted to this. The functions implemented in the image processing chip and engine chip may be integrated into a single chip. In this case, for example, reducing the number of ink colors to be processed at one chip enables the same advantage as the advantage of the first embodiment to be obtained.

Also, though an example has been described in the first embodiment in which improvement in scalable throughput is realized by increasing the number of chips with the chips as basic units, the basic units are not restricted to the chips.

Examples of the basic units include a unit unitized from a module where the RAM and connector connected to each of the image processing chip and engine chip are mounted on a print substrate. Pattern wiring is performed beforehand on the print substrate so that modules are electrically connected at the time of fitting connectors, and multiple modules are connected in a cascade manner, whereby the chips are electrically and logically connected in a cascade manner. Even when the units are configured having a print substrate module, the same advantage is yielded.

Also, though description has been made in the above embodiment regarding the image processing chips and engine chips used for image processing, the configuration of the chips is not restricted to this. The configuration of these chips is effective in the case of executing multiple processes (multiple ink color processes in the first embodiment). Also, it is sufficient for the chips to have the data processing function and transfer/output function.

Though the printer 101 has been exemplified as an image processing apparatus in the above embodiment, the image processing apparatus does not have to include all of the above configurations. Also, the recording system of the image processing apparatus is not restricted to a particular system, and may be the ink jet system or electrophotography system. Also, the image processing apparatus is not restricted to the printer, and may be a device configured to perform image processing.

Further, all of the above embodiments do not have to be executed by hardware, and part thereof may be configured as software.

According to the present invention, increasing the number of image processing units enables an image processing system and an image processing method capable of improving throughput in a scalable manner to be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   a first image processing chip and a second image processing chip configured to execute image processing on received image data, wherein the first image processing chip and the second image processing chip are connected in serial;
   wherein the first image processing chip has
      a transfer unit configured to transfer the received image data, and
      a first image processing unit configured to execute image processing on the received image data, and
      a determination unit configured to determine a color to be allocated to each processing chip, and
   wherein the second image processing chip has
      a second image processing unit configured to execute image processing on the received image data,
   wherein in a case where the first image processing chip receives first image data, the first image processing unit generates second image data by executing image processing on a first processing color of the first image data, and the transfer unit transfers the first image data and the second image data, and
   wherein in a case where the second image processing chip receives the first image data transferred from the first image processing chip, the second image processing unit generates third image data by executing image processing on a second processing color of the first image data, the second processing color being different from the first processing color.

2. The image processing apparatus according to claim 1, wherein the first image data is data of RGB color space, and the second image data and the third image data are data of ink color space.

3. The image processing apparatus according to claim 1, wherein the first processing color is one or more color and the second processing color is one or more color.

4. The image processing apparatus according to claim 1, wherein the first image processing chip further has a storage control unit configured to store the received image data in a first memory for the first image processing chip, and the first image processing unit executes the image processing on the first processing color of image data read out from the first memory.

5. The image processing apparatus according to claim 1, wherein the determination unit is configured to determine a number of colors to be allocated to each image processing chip according to a number of colors to be used in printing.

6. The image processing apparatus according to claim 1, wherein in a case where the first image processing chip receives the first image data, the transfer unit transfers the first image data and the second image data to the second image processing chip.

7. The image processing apparatus according to claim 1, wherein each of the first image processing chips and the second image processing chips has, as each of the first image processing unit and the second image processing unit, a first image processing section configured to generate binary data from image data and/or a second image processing section configured to generate print data from binary data, and
wherein the binary data generated by the first image processing section is transferred to a next image processing chip and the print data generated by the second image processing section is transferred to a printing unit.

8. The image processing apparatus according to claim 7, wherein, in the image processing apparatus, a first processing unit group in which a plurality of image processing chips having the first image processing section are connected in serial, and a second processing unit group in which a plurality of image processing chips having the second image processing section are connected in serial, are connected in serial.

9. The image processing apparatus according to claim 7, wherein, in the image processing apparatus, an image processing chip having the first image processing section and an image processing chip having the second image processing section are alternately connected to each other in serial.

10. The image processing apparatus according to claim 1, wherein an interface configured to connect each of the first image processing chip and the second image processing chip is an interface conforming to the PCI-Express standard.

11. The image processing apparatus according to claim 1, further comprising a printing unit configured to execute printing based on data output from an image processing unit of at least one image processing chip.

12. An image processing method using a first image processing chip and a second image processing chip which execute image processing on received image data, the first image processing chip and the second image processing chip being connected in serial, the method comprising:
determining a color to be allocated to each image processing chip;
generating, in a case where the first image processing chip receives first image data, second image data by executing image processing on a first processing color of the first image data by the first image processing chip;
transferring the first image data and the second image data; and
generating, in a case where the second image processing chip receives the first image data transferred from the first image processing chip, third image data by executing image processing on a second processing color of the first image data, the second processing color being different from the first processing color.

13. An image processing apparatus comprising:
a first image processing chip and a second image processing chip configured to execute image processing on received image data, wherein the first image processing chip and the second image processing chip are connected in serial;
wherein the first image processing chip has
a first image processing unit configured to generate second image data by executing image processing on first image data as received image data, and
a transfer unit configured to transfer received image data and the second image data, and
wherein the second image processing chip has
a second image processing unit configured to generate third image data by executing image processing on received image data transferred from the first image processing chip, and
wherein image processing of data of different bands is allocated to each of the first processing chip and the second image processing chip.

14. The image processing apparatus according to claim 13, wherein, in a case where the first image processing chip receives image data, the first image processing unit generates the second image data by executing image processing on received image data, and
wherein, in a case where the first image processing chip receives image data, the transfer unit transfers received image data.

15. The image processing apparatus according to claim 13, wherein image processing of the same color is allocated to each of the first image processing chip and the second image processing chip.

16. The image processing apparatus according to claim 13, wherein the received image data is data of RGB color space, and the second image data and the third image data are data of ink color space.

17. The image processing apparatus according to claim 13, wherein the first image processing chip further has a storage control unit configured to store the received image data in a first memory for the first image processing chip, and the first image processing unit executes the image processing on image data read out from the first memory.

18. The image processing apparatus according to claim 13, further comprising a determination unit configured to determine band data to be allocated to each image processing chip.

19. The image processing apparatus according to claim 13, wherein each of the first image processing chips and the second image processing chips has, as each of the first image processing unit and the second image processing unit, a first image processing section configured to generate binary data from image data and/or a second image processing section configured to generate print data from binary data, and
wherein the binary data generated by the first image processing section is transferred to a next image processing chip and the print data generated by the second image processing section is transferred to a printing unit.

20. The image processing apparatus according to claim 19, wherein, in the image processing apparatus, a first processing unit group in which a plurality of image processing chips having the first image processing section are connected in serial, and a second processing unit group in which a plurality of image processing chips having the second image processing section are connected in serial, are connected in serial.

21. The image processing apparatus according to claim 19, wherein, in the image processing apparatus, an image processing chip having the first image processing section and an image processing chip having the second image processing section are alternately connected to each other in serial.

22. The image processing apparatus according to claim 19, wherein an interface configured to connect each of the first image processing chip and the second image processing chip is an interface conforming to the PCI-Express standard.

23. The image processing apparatus according to claim 13, further comprising a printing unit configured to execute printing based on data output from an image processing unit of at least one image processing chip.

24. An image processing method using a first image processing chip and a second image processing chip which execute image processing on received image data, the first image processing chip and the second image processing chip being connected in serial, the method comprising:
    generating second image data by executing image processing on first image data as received image data by the first image processing chip;
    transferring received image data and the second image data; and
    generating third image data by executing image processing on received image data transferred from the first image processing chip,
    wherein image processing of data of different brands is allocated to each of the first image processing chip and the second image processing chip.

* * * * *